United States Patent [19]
Hensen et al.

[11] 3,751,015
[45] Aug. 7, 1973

[54] SCREW EXTRUDER WITH RADIALLY PROJECTING PINS

[75] Inventors: Friedhelm Hensen, Remscheid; Hans Siemetzki, Hilgen; Egon Gathmann, Huckeswagen, all of Germany

[73] Assignee: Barmag Barmer Maschinenfabrik Aktiengesellschaft, Wuppertal, Germany

[22] Filed: June 22, 1971

[21] Appl. No.: 155,458

[52] U.S. Cl. .............. 259/191, 100/145, 425/205
[51] Int. Cl. .................... B29f 3/01, B29b 1/06
[58] Field of Search ............... 259/8–10, 191–193, 425/205, 208; 100/145; 415/72

[56] References Cited
UNITED STATES PATENTS

| | | | |
|---|---|---|---|
| 2,838,794 | 6/1958 | Munger et al. | 259/191 |
| 3,160,688 | 12/1964 | Aykanian | 264/53 |
| 3,252,182 | 5/1966 | Colombo | 259/192 |
| 3,487,503 | 1/1970 | Barr et al. | 425/208 |
| 3,591,146 | 7/1971 | Sutter | 259/10 |
| 3,595,533 | 7/1971 | Sutter | 425/205 |
| 3,623,254 | 1/1972 | Woodham | 425/205 |
| 3,652,064 | 3/1972 | Lehnen et al. | 425/208 |
| 3,680,844 | 8/1972 | Menges et al. | 425/205 |

*Primary Examiner*—William T. Price
*Assistant Examiner*—Stuart S. Levy
*Attorney*—Johnston, Root, O'Keeffe

[57] ABSTRACT

A screw extruder for the continuous processing of a synthetic thermoplastic material in which one section of the rotatable screw in the metering or discharge zone of a barrel extruder carries a plurality of radially projecting pins of different specific heights in place of the thread flight, this section extending along an axial length of at least two screw diameters. This combination of apparatus is particularly useful in evening or equalizing the temperature of the processed thermoplastic material.

10 Claims, 5 Drawing Figures

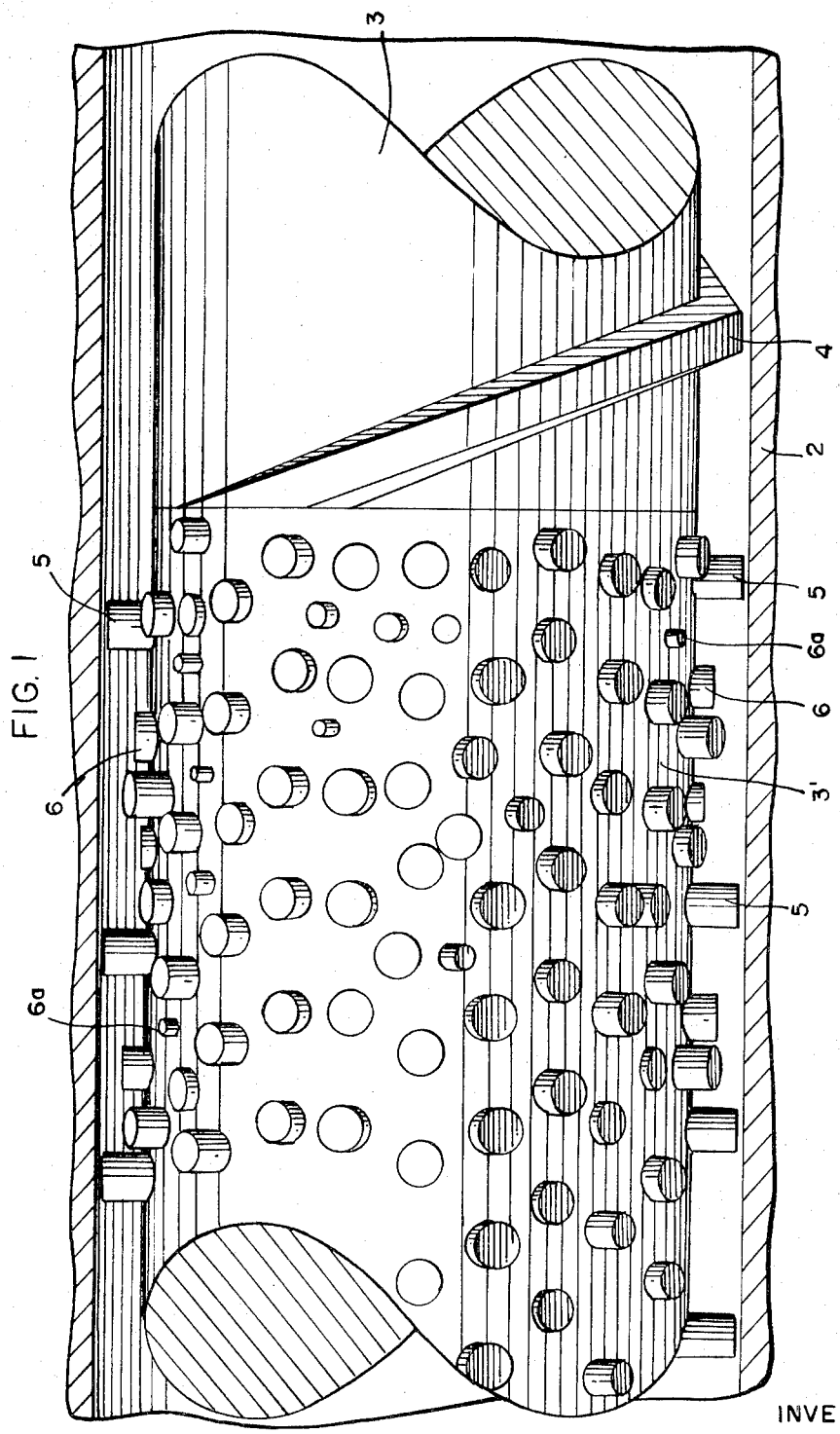

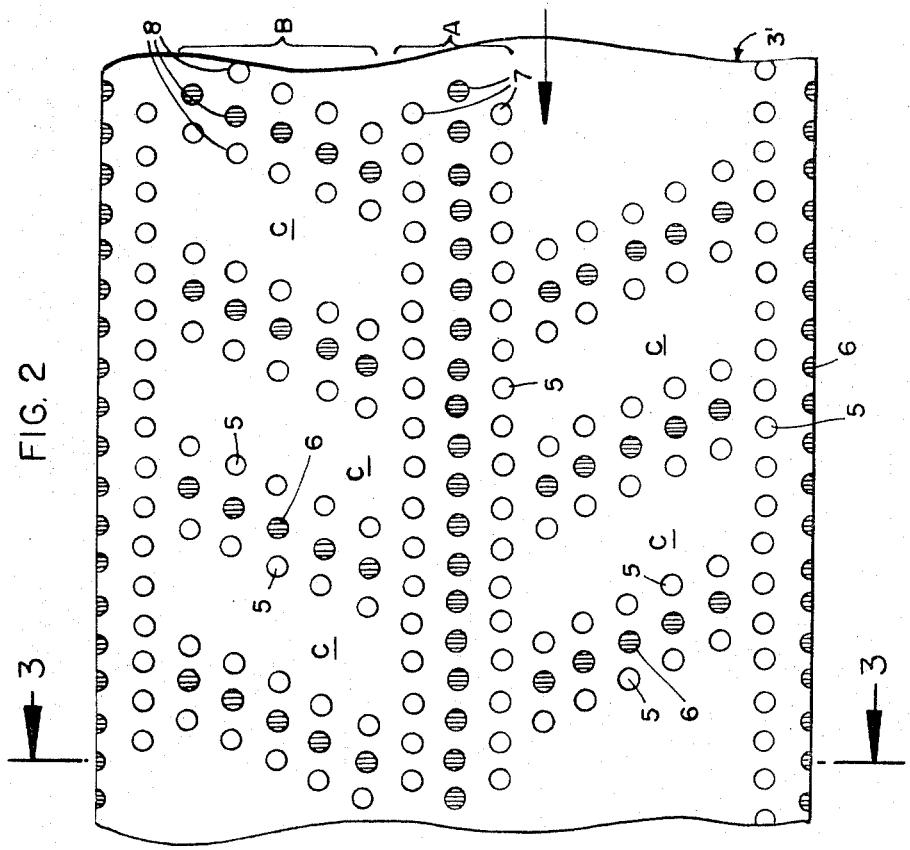
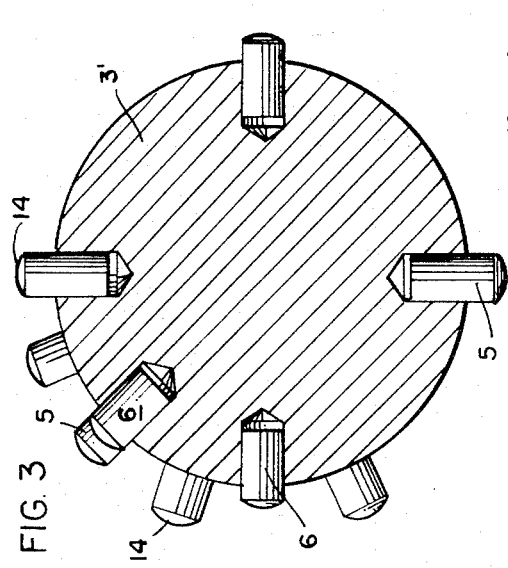
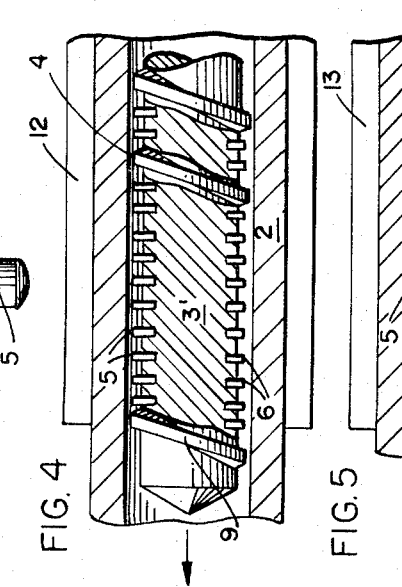
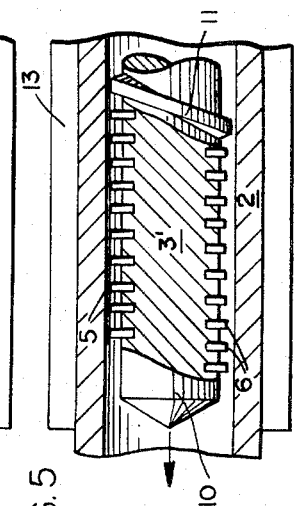
INVENTORS:
FRIEDHELM HENSEN
HANS SIEMETSKI
EGON GATHMANN
BY: Johnston, Root, O'Keeffe, Keil, Thompson & Shurtleff
ATT'YS

SCREW EXTRUDER WITH RADIALLY PROJECTING PINS

This invention generally relates to screw extruders adapted to continuously process a synthetic thermoplastic polymer material by means of a rotatable single worm or screw which is provided on a core or root surface with radially projecting pins spaced from one another. These pins or pegs are arranged on the periphery of the screw core and provide a device for the thorough mixing and homogenizing of the more or less uniform thermoplastic polymer melt which is present in the metering or pumping zone of the extrusion press where this melt essentially flows in laminar and non-turbulent streams.

Screws provided with various types of projections or stubs are known. Depending on the intended purposes, e.g., a thorough mixing alone or a thorough mixing in conjunction with a homogenizing of the molten plastic material, the projections are provided either in the feed zone or also in the so-called compression or transition zone or sometimes in the metering or discharge zone of the screw extruder. Screws with such projections on the root or core have been proposed in various different embodiments, and these differ substantially according to the type of construction, placement and/or arrangement of the projections.

In a kneading press for alimentary pastes (pastry dough) according to U.S. Pat. No. 2,620,752, which consists essentially of a double worm and a single worm arranged transversely to it, there is disclosed a number of individual radial projections or knobs arranged along the spiral channel on the periphery of the screw core between adjacent thread flights. In providing these projections between the thread flights of the usual screw channel, they form over a length of several screw channels a single row of cap-shaped or hemispherical kneading means, all of which are constructed alike according to shape, size and height.

Furthermore, it has been suggested in U.S. Pat. No. 2,838,794 to provide shallow projections on a screw in an extrusion apparatus for processing thermoplastic material, which projections act as a resistance to the melt flow and are described as helping to maintain proper frictional forces between the screw and the plastic. The screw according to this patent has for this purpose numerous small, sharp-edged projections of a certain geometric shape and size as well as a specific very low height. All of these projections are constructed so as to be equal in shape, size and radial height. The projections are arranged parallel to each other in rows between the conventional thread flights of the screw channel in the feed zone of the screw extruder.

For the thorough mixing of a thermoplastic polymer melt in a screw extruder, it has further been proposed to arrange elongated projections in the screw channel between the thread flights. These elongated projections also extend radially from the outer surface of the core or root of the screw toward the screw casing or housing, their outer surface being aligned with the outer surface of the adjacent thread flights, i.e., the surface of the flight lands. At least one row of these projections is provided along at least one side of the thread, and this is disposed transversely in the screw channel. There can also be arranged several rows of such elongated projections adjacent and parallel to each other, and they can be arranged both in the transition zone and also in the metering zone of the screw extruder. In all cases, however, such projections are situated only between adjacent thread flights of the normal screw channel. These projections essentially form these cams partial streams of the plastic in the screw channel. In the case of relatively high discharge velocities, for example with a screw turning rate in the region of 60 revolutions per minute and with use of a screw having relatively large thread depth, e.g., in the area of 5 mm. depth, as well as with individual projections whose free radial height projecting outwardly beyond the screw core or root always corresponds to the size of the screw thread depth and corresponding to a diameter about on the same order of magnitude, it is possible in the processing of highly viscous thermoplastic materials to achieve a reasonable uniformity with respect to temperature, mixing and, where required, also with respect to dyeing or pigment coloration of the thermoplastic polymer. The thorough mixing achieved is generally satisfactory for a wide variety of thermoplastic materials subjected to extrusion molding. The temperature equalization between the hotter core melt and the outer peripheral melt generally is sufficient to provide a temperature differential ($\Delta T$) which lies between about 3° and 5° C.

In all the above mentioned proposals, the flowing thermoplastic material, when in the form of a melt, is more or less intensively mixed by the projections provided within the continuous spiral screw channel laterally bounded by the thread flights. However, just as before the introduction of these projections, the screw channel determines the main direction of flow. In this manner the intended mixing effect is considerably influenced. On the other hand, it is not possible to achieve in this manner for all thermoplastic materials a favorable mixing effect in combination with a favorable temperature distribution or equalization.

A favorable result with respect to thorough mixing and homogenization of a thermoplastic material melt is achieved by wart-like studs or projections in the area immediately before the discharge region of a screw extruder. Thus, in the extruder according to German published application No. 1,289,302, there are provided for this purpose such wart-like projections situated alternately on the end surface or tapered head of the screw as well as on the opposing surface of the barrel housing which may be a correspondingly tapered mouth or throat of a nozzle. These projections, preferably in the form of spirally oriented bodies, are arranged in a series of successive coaxial circles concentric to the screw axis.

The melt flowing laminarly in the discharge zone by reason of its high viscosity is subdivided in a positive or forced manner by the oppositely situated projections, which can be compared with bosses or baffles of low height, in which process the constituent portions of the melt are set into turbulence and thus mixed with one another. By reason of this thorough mixing effect, there is likewise an active influence on the temperature variation in the melt. The turbulence of the melt constituents brought about by the projections moved past one another in comb-like manner, however, depending on the type of thermoplastic material to be processed in the screw extruder, can lead to the result that additional frictional heat is developed which is locally very high. There is obtained, to be sure, a largely homogeneous and well mixed melt by reason of using the described projections, but a favorable temperature distribution is not to be achieved since too little time remains for equalization of the melt temperature with this action of the melt.

Such a solution is disadvantageous in a screw extruder insofar as the number of projections is necessarily restricted because of their alternate arrangement on the end surface of the screw and the interior surface of the housing lying opposite it. If, nevertheless, a large number of projections should be provided in such a structure, then the screwheads or projections are to be arranged in the radial direction on the cylinder part of the screw end and on the corresponding part of the opposing nozzle or housing wall. In this case there are yielded disadvantages with respect to manufacturing and installation of various parts since the cylinder or barrel housing wall must now be provided with additional cavities and threads for the projections, and the installation of the worm or screw of the extruder is rendered much more difficult.

One object of this invention is to provide an extruder in which a synthetic polymer melt is to be subdivided in the metering zones of the screw with the aid of a mixing device or element which is located only on the screw and which is simple in construction but extremely efficient. This mixing device or element should break up the polymer melt into a large number of individual melt streams which are then differently united, i.e., recombined in a different order in sequence and position.

Another object of the invention is to provide an improved screw extruder whereby the melt is presented at the discharge opening of the screw with excellent temperature equalization as well as being optimally intermixed and homogenized.

It is a further object of the invention to provide screw extruder apparatus which is equally effective with low, medium and high working rates of the screw and which works equally well in screws with a normal L/D ratio as well as an unusually large or small L/D ratio. Moreover, the apparatus is to be equally applicable for processing highly viscous as well as more fluid thermoplastic materials.

These and other objects and advantages of the invention will become more apparent upon consideration of the following detailed specification.

It has now been found, according to the present invention, that such objects are effectively achieved in an otherwise conventional screw extruder for continuously processing a thermoplastic polymer, by providing at least one section of the screw in the metering or pumping zone of the extruder which is free of thread flights over an axial length of at least two times the screw diameter and which carries a large number of pins projecting radially from the threadless screw core, the individual pins being varied between at least two different free radial heights and the ratio of pin diameter to said free height being from 0.25:1 to 2:1. Pins with different heights are preferably present as long and short pins. The threadless screw section must have a length of at least about 2D (two screw diameters), the upper limit being less critical and selected for reasons of economy, e.g., up to about 4D. As the threadless section of the screw core, there can be provided the free screw end or one or more arbitrary sections of the screw in the metering zone or both of these in common, i.e., from the beginning of the metering zone up to the screw end at or adjacent to the discharge outlet of the extruder. The metering zones of extruders represent a definite length of the screw which usually exhibits a different channel cross-section or different thread pitch than the feed or transition zones.

The ratio of the pin diameter to its free radial height is desirably maintained within the above noted limits of 0.25 to 2.0. The short and long pins provided in large number are alternately and/or irregularly arranged along the threadless core or root of the screw section.

The exact number of pins or projections required on the threadless screw section is somewhat difficult to define in view of their variation in size, shape, position and the like. In general, however, approximately cylindrical pins are especially useful which are located in closely spaced relationship on at least half and preferably two-thirds or more of the 2D peripheral length of the threadless core or root of the screw. In addition, it is estimated that the total surface area of all of the radially projecting pins, measured as the total exposed surface area of cylinders which project radially outwardly from the root of the screw, should preferably amount to at least about one-fourth and preferably one/third or more additional surface area than that which would otherwise be provided by the threadless core or root alone, i.e., free of threads and projections. This means that there must be a very substantial number of pins with a relatively large radial height.

It is also very desirable to provide a clear spacing or flow gap of not more than 1.5 times a pin diameter between adjacent cylindrical pins, a preferred embodiment of the invention employing pins which are all equal or approximately equal in diameter. Since the channel depth or spacing between the root surface and wall of the barrel is relatively small in the metering zone, the limited ratio of height to diameter of the individual pins will generally require at least about 10 pins on an axial line over the threadless section of the screw, depending upon the exact length of this section which is at least two times the screw diameter.

A number of embodiments of the invention together with certain preferred features are further described in conjunction with the accompanying drawing in which:

FIG. 1 is a partial side view of one cutaway segment of the screw in a metering zone with the inner walls of the barrel housing indicated in cross-section, this particular screw carrying radially projecting pins of different diameters and varying free radial heights;

FIG. 2 is a partly schematic peripheral layout of the pin carrying threadless section of the screw where the pins have been arranged in a so-called "fishbone" or "herringbone" pattern over this length of the screw;

FIG. 3 is a cross-sectional view taken on line 3—3 of FIG. 2, i.e. through the cylindrical root or core of the screw with the pins placed as in FIG. 2;

FIG. 4 is a cross-sectional view through another embodiment of the screw to illustrate the location of the pins in the metering section adjacent a final screw thread at the free end; and FIG. 5 is a cross-sectional view of still another screw embodiment to illustrate the location of pins on the free end of the screw after the final screw thread of the metering section.

Referring first to FIG. 1, the screw 1 is rotatably driven in the barrel housing 2 of a screw extruder for continuously processing thermoplastic materials, with a root or core 3 of the screw bearing thread flight 4 which terminates just before the mixing device or special screw section 3' of the invention. The mixing device essentially consists of a large number of radially projecting pins of differing height, in which the long pins are generally designated as 5 and the short pins as 6. The individual pins are preferably shrunk and press fitted into corresponding radial bores in a section of the screw free of the thread flight, for example, that portion of the core 3' of an arbitrarily selected screw section within the conventionally required metering zone or zones. The metering zones are essentially all of the extruder zones which occur after the compression or transition zone in the extrusion direction. These screw zones differ, for example, in having different core cross-sections, the metering zone generally having the greatest circular cross-section and the smallest channel height or thread depth. See, for example, the basic extrusion fundamentals disclosed in Chapter eleven of "Plastics Extrusion Technology" by Griff, Van Nostrand Reinhold Co., 2nd Edition (1968).

In the embodiment according to FIG. 1 there are irregularly and alternately arranged long and short pins 5 and 6, respectively, which are interspersed with other smaller diameter pins 6a. The ratio of pin diameter to free radial length lies in the range between 0.25 and 2.0. The clear spacing or flow gap from pin to pin is chosen irregularly; however, with reference to the larger diameter pins 5 and 6, this gap is smaller than 1.5 pin diameters. On the basis of this design of the pin locations and of the arbitrary arrangement of the individual pins, there is obtained at least one threadless screw section in the metering zone or zones of the extruder wherein such pins provide free flow gaps for the thermoplastic melt, the gaps being of differing heights and widths.

In the embodiment according to FIGS. 2 and 3, the pins of equal diameter are arranged in circumferentially and/or axially spaced groups, partly in axially parallel rows 7 and partly in rows 8 at an angle to the screw axis. Such an arrangement is called a "fishbone" or "herringbone" pattern. Preferably, every three axial pin rows 7, for example an inner row with short pins 6 and two outer rows with long pins 5, form one pin group A and every three of the transversely angled pin rows 8, for example a middle row with short pins 6 and two outer rows with long cams 5, form a pin group B. The pin rows 8 thus intersect the pin rows 7 at an angle. The direction of extrusion is indicated by the arrow on the right-hand side of the peripheral layout. The pin groups B are arranged at specific but selectible lateral or axially directed spacings relative to one another and obliquely to the screw axis. Adjacent pin groups B form, with the aid of the two pin groups A, a number of separated screw zones C which are free of pins, threads or any other projections.

It is possible for the arrangement of the pins to be such that the zone in which the pins are located extends into the screw channel bounded by thread flights and adjacent to a threadless screw section, as indicated for example in FIG. 4.

Moreover, it is possible and often preferred to provide the special mixing segment of the invention along the last portion of the metering zone as shown in FIGS. 4 and 5, either before at least one final flight land 9 as in FIG. 4, or on the screw head itself 10 extended over a length of at least twice the screw diameter as indicated in FIG. 5 following termination of the metering screw flight 11. Again, the arrow in these embodiments indicates the direction of extrusion produced by the screw, the previous feed and transition zones being omitted since they are constructed in conventional manner.

The discharge outlet or ejection portion of the screw extruder which follows the metering zone, e.g., along or just beyond the free end of the screw, is also capable of being quite conventional in its design as a smooth bored segment of the barrel housing which does not require any special profiling or insertion of projections or other baffles in coaction with the radial pin projections of the invention. Also, this discharge outlet can be equipped with conventional screens and/or breaker plates as well as valve means to control the flow and pressure of the melt. Known heating and/or cooling means can also be applied to the screw extruder, e.g., the usual electrical heaters operated as resistance or induction heaters or else outer jackets or internal bores for carrying a heat exchange fluid. In many cases a cooling jacket 12 is preferred for purposes of the present invention (FIG. 4) although a heating jacket 13 may also be used (FIG. 5).

All of the above mentioned embodiments have in common the feature that heat transfer takes place through heat conduction within the melt region around each pin, because melt portions of differently converging partial melt streams are constantly brought together with melt portions of other partial melt streams. On the other hand, during the flowing around the individual pin, there also takes place an additional heat transfer through heat flow between the melt and the pin, since a relatively large portion of the melt comes in contact with individual pins of the large number present in the metering zone.

The thermoplastic melt, which is more or less well homogenized, flows in substantially laminar melt layers in the metering zone of the extruder is effectively and extremely efficiently mixed in one and/or another threadless screw section provided in this metering zone by reason of the chosen design and arrangement of the pins. Due to the large number of long and short pins provided, the thermoplastic melt is subdivided into individual melt streams which flow in directions which are partly axially parallel, partly diagonal, partly orthogonal and partly radial with reference to the screw axis. Simultaneously, individual melt streams are conducted around the individual pins or additionally directed over the ends of the short pins. In the flow of the melt through the remaining free interspaces or flow gaps between adjacent pins, differently spaced from pin to pin, the individual melt streams are differently accelerated and after short flow paths around about the pins or over their ends, these individual streams are reunited with further individual streams and in part also superposed above or below other individual streams.

According to one preferred embodiment as indicated above, all the pins are approximately equal in diameter and arranged at a flow gap spacing of less than 1.5 pin diameters. Although more uniform or regular placement of the pins in this manner reduces the randomness of flow, there is still an excellent mixing in the sense of achieving a high degree of temperature equalization.

Where the pins are arranged in the manner of a herringbone pattern as in FIGS. 2 and 3, both the pin groups and the pin rows of the herringbone pattern and also the pin-free zones receive the constantly flowing melt in the various different directions indicated above, in which process the hotter core melt is intensively mixed with outer peripheral or border melt and vice versa. On the basis of the melt drag flow and the melt pressure flow, there is yielded a mean flow angle of the melt which does not agree with the chosen angle, for example, of the axially angular pin row of the herringbone pattern arrangement. By reason of the pin section constructed free of thread flights on the screw core and because of the melt flow angle, all the melt components are brought into contact with numerous pins over the entire flow path through the mixing section of the invention. Through the constant but briefly repeating subdividing and uniting of a large number of individual melt streams as a result of the large number of long and short pins over a certain longitudinal or axially elongated section, the thermoplastic melt becomes increasingly homogeneous and much more equal with respect to its temperature. The melt portions which flow around the pins or over the ends of the pins are more or less regularly directed by the pins and the melt portions which flow through the pin-less areas flow, in comparison to the aforementioned melt portions, in a more irregularly directed manner. On the one hand, various divided melt streams unite frequently with others and, on the other hand, melt layers are superimposed or different layers flow into one another and, in most instances, in locally differing directions and with locally different flow speeds.

By reason of the large number of the pins provided in the mixing section of the invention, there is present a considerably greater surface of this screw section, as compared to that of any comparable known screws. In general the surface area of this screw is enlarged about 100 percent by the invention.

According to further features of the invention, the radial projections are preferably constructed in the form of cylindrical pins. For the purpose of the most favorable flowing of the melt over the pins, these are shown to be rounded on the end surface 14 away from the screw core and facing the inner wall of the housing 2 (see FIG. 3). The pins can also have differing diameters, so that through these measures there are arranged a number of pins of alternatingly different thickness. The clear spacings or flow gaps between the pins are thereby more variable. The melt partial streams, because of the difference in height and diameter of the pins which results in a changing of the flow speed, as well as because of the resulting irregular spacings, take on a very irregular course or flow path which leads to a very irregular dividing and reuniting of the individual melt streams.

The pins are preferably arranged shrunk-fit into the threadless core section of the screw using conventional heat-resistant and corrosion resistant metals common in screw extruders. The removal of the conventional thread flight is accomplished, for example, by milling it off over the presecribed length. In the event that a threadless section is provided at the screw end, there can also be provided a separate pin-carrying or radially studded cylindrical part whose diameter, within limits, is somewhat greater or smaller than the screw core diameter. This modified screw end or head can be provided as an extension which can be screwed onto the metering section of the extruder screw.

The radial extension of the long pins 5, as measured between pin apex or outer end 14 and the screw axis, is about equal to or up to only 1 percent smaller than the screw radius; the radial extension of the shorter pins 6 with otherwise equal diameter and position is about 4 to 12 percent smaller than the screw radius.

Tests have been carried out with the apparatus of the invention in which, on the basis of the new mixing section apparatus, the temperature differential ($\Delta T$) amounts to less than 1° C. in the discharged melt, and more particularly, that temperature difference measured between the melt flow at the core of the screw and the melt flow at the outer periphery along the barrel housing. The temperature of the melt flowing from the novel mixing section of the screw was thereby approximately equal at every point of the flow cross-section. Furthermore, the desired melt temperature was controlled and maintained at a favorable value as was desired for its discharge into a die connected at the outlet end of the screw extruder. This is especially important if the melt, after leaving the extruder, is to pass into a distributor line system before being extruded, e.g., as with spinning melts for films, filaments and the like.

Comparative values were obtained from futher experiments using a screw which had pins located within a screw channel between two conventional thread flights, and this comparison exhibited a $\Delta T$ in the range between 5° and 8° C. over the same comparable flow cross-section. In all the tests carried out, the melts were approximately equally uniform with respect to the degree of mixing and the degree of homogenization, but this was not the case with respect to the equalization of the temperature. The improved temperature evening or equalization within a $\Delta T$ of less than 1° C. was achieved only with the new mixing section, and this represents a significant advance over prior devices where a $\Delta T$ of 5°–8° C. is common and a $\Delta T$ of less than 3° C. has not generally been attainable.

The screw extruder of the invention with its special mixing section is broadly useful with all synthetic thermoplastic polymers, especially those used as film-forming or fiber-forming polymer melts such as polyamides (nylons), polyesters (polyethylene terephthalate) and polyolefins (polyethylene and polypropylene) or closely related modifications of such polymers. Together with the desired temperature equalization, the invention is capable of uniformly mixing and homogenizing such polymers at high throughputs even with the relatively long (2D) mixing section with its numerous flow-deflecting pins.

The mixing and heat-equalizing processes which can be accomplished with the aid of the new mixing element take place without excessive pressure or undesirable shearing influences on the melt. There are no unduly narrow gaps between the individual radial pins or between the pins and the inside wall of the housing that have to be flowed through or around under disadvantageous conditions.

Those partial melt streams which are directed diagonally in the mixing section are essentially those that flow between the pins and around the pins. The orthogonally directed partial streams are essentially those that flow through the pin-free zones while the radially directed streams are substantially those that flow off over the short pins. The axially parallel as well as axially angularly directed melt streams generally result in the uniting of coverging individual streams. Such omnidirectional flow is believed to be at least partly responsible for the excellent mixing and temperature equalization while avoiding local hot spots and/or melt stagnation.

Thus, by means of the cyclically repeating subdividing, uniting, layer superimposing and layer mixing of the melt portions from variously directed melt streams and with the large surface area present in the mixing section, including the surface of the thread-free and pin-free screw core, and by reason of the interspaces present between the screw core and the interior wall of the housing, there is brought about in the flow of the melt through the mixing section of the invention both an intensive intermixing and homogenization and also an extremely efficient temperature equalization.

The radial projections of the mixing device of the invention, as noted above, are preferably present as cylindrical pins or closely equivalent elongated studs which are inserted by shrink fitting into easily drilled bores in the root or core of the screw. Such a device is not only simple in construction and highly efficient in use, but is also cheaply manufactured from existing screws and can be easily installed in conventional barrel housings. Minor variations in structure and form are of course permissible within the scope of the invention.

The invention is hereby claimed as follows:

1. In a screw extruder for the continuous processing of a thermoplastic polymer wherein a barrel housing surrounds a single rotatable screw having a metering zone toward the discharge end thereof, the improvement which comprises at least one section of the screw in said metering zone which is free of thread flights over an axial length of at least two times the screw diameter and which carries a large number of pins projecting radially from the threadless screw core, the individual pins being varied between at least two different free radial heights and the ratio of pin diameter to said free height being from 0.25:1 to 2:1.

2. A screw extruder as claimed in claim 1 wherein said pins of different heights are arranged in an irregular sequence.

3. A screw extruder as claimed in claim 1 wherein all of said pins have approximately the same diameter and are arranged next to one another to provide a flow gap therebetween of not more than 1.5 pin diameters.

4. A screw extruder as claimed in claim 1 wherein pins of different free radial heights are arranged in groups along the core surface such that said threadless core section also contains zones which are free of pins.

5. A screw extruder as claimed in claim 4 wherein said pin groups are arranged in a herringbone pattern.

6. A screw extruder as claimed in claim 1 wherein said pins are essentially cylindrical in shape.

7. A screw extruder as claimed in claim 6 wherein the end surfaces of the pins facing the inner wall of the housing are rounded.

8. A screw extruder as claimed in claim 1 wherein all of said pins are composed of a highly polished metal which is heat- and corrosion-resistant and which has a good heat-conducting capacity.

9. A screw extruder as claimed in claim 1 wherein the distance from the screw axis to the apex of the longest pins is equal to the screw radius or up to 1 percent less than the screw radius while the corresponding distance of the shorter pins is within a range of about 4 to 12 percent less than the screw radius.

10. A screw extruder as claimed in claim 1 wherein the radial pins are carried over a length of the screw extending into a screw channel adjacent that section of the screw which is free of thread flights.

* * * * *

UNITED STATES PATENT OFFICE
CERTIFICATE OF CORRECTION

Patent No. 3,751,015               Dated August 7, 1973

Inventor(s) Friedhelm Hensen et al

It is certified that error appears in the above-identified patent and that said Letters Patent are hereby corrected as shown below:

First page, left-hand column, eleventh line, insert
-- [30] Foreign Application Priority Data
        June 23, 1970 Germany . . . P 20 30 756.6 --.

Column 2, line 4, "form these cams" should read -- form --.

Column 7, line 58, "presecribed" should read -- prescribed --.

Signed and sealed this 27th day of November 1973.

(SEAL)
Attest:

EDWARD M. FLETCHER, JR.        RENE D. TEGTMEYER
Attesting Officer              Acting Commissioner of Patents